United States Patent [19]

Kamprath et al.

[11] Patent Number: 4,951,783
[45] Date of Patent: Aug. 28, 1990

[54] ARRANGEMENT AND PROCESS FOR SECURING A THREADED INSERT TO AN OIL PAN

[75] Inventors: Axel Kamprath, Endingen; Thomas Wehr, Ditzingen, both of Fed. Rep. of Germany

[73] Assignee: Dr. Ing. h.c.F. Porsche Aktiengesellschaft, Fed. Rep. of Germany

[21] Appl. No.: 406,540

[22] Filed: Sep. 13, 1989

[30] Foreign Application Priority Data

Sep. 15, 1988 [DE] Fed. Rep. of Germany ....... 3831308

[51] Int. Cl.$^5$ ............................................. F16N 33/00
[52] U.S. Cl. .................................... 184/1.5; 123/195 C
[58] Field of Search .................... 184/1.5; 123/196 R, 123/195 C

[56] References Cited

U.S. PATENT DOCUMENTS

| 2,235,078 | 3/1941 | Meisterhans | 411/82 |
| 4,027,644 | 6/1977 | Timour | 123/195 C |
| 4,303,362 | 12/1981 | Lockhart | 123/195 C |
| 4,472,861 | 9/1984 | Joseph et al. | 24/290 |
| 4,522,165 | 6/1985 | Ogawa | 123/195 C |
| 4,588,420 | 5/1986 | Charuat | 264/71 |
| 4,729,705 | 3/1988 | Higgins | 411/82 |

FOREIGN PATENT DOCUMENTS

| 2217438 | 11/1972 | Fed. Rep. of Germany . |
| 3020818 | 4/1980 | Fed. Rep. of Germany . |
| 3606052 | 7/1986 | Fed. Rep. of Germany . |
| 3246768 | 12/1989 | Fed. Rep. of Germany . |
| 2523663 | 9/1983 | France . |
| 63-71510 | 3/1988 | Japan | 184/1.5 |

Primary Examiner—Stephen F. Husar
Assistant Examiner—Alan B. Cariaso
Attorney, Agent, or Firm—Evenson, Wands, Edwards, Lenahan & McKeown

[57] ABSTRACT

An oil pan for an internal combustion engine has a metallic gastight and fluidtight threaded insert for receiving an oil drain plug, the insert having a cylindrical section which rests in an opening of a wall of the oil pan. The cylindrical section of the threaded insert, on an exterior side of the oil pan, is provided with a collar which, by means of a sealing adhesive arrangement, is fastened to the exterior wall section of the oil pan.

4 Claims, 1 Drawing Sheet

U.S. Patent
Aug. 28, 1990
4,951,783
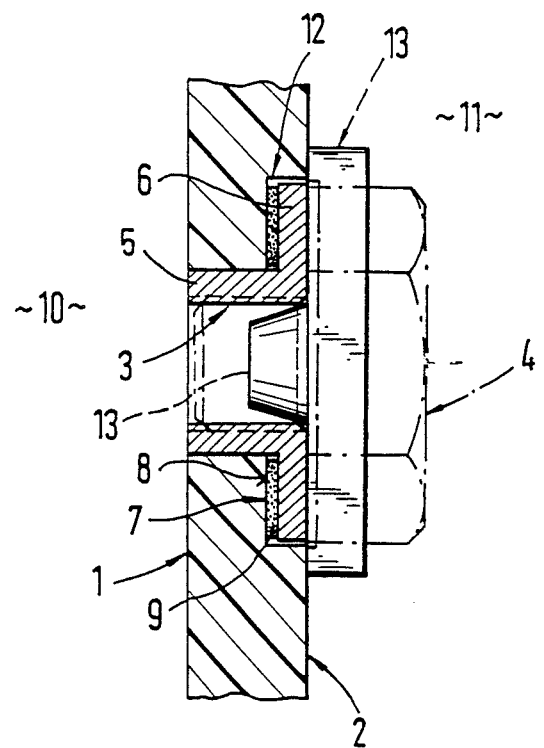

ARRANGEMENT AND PROCESS FOR SECURING A THREADED INSERT TO AN OIL PAN

BACKGROUND AND SUMMARY OF THE INVENTION

The present invention generally relates to an oil pan and more particularly to a process and arrangement for securing a metal insert to an oil pan made of plastic.

German Patent Specification (DE-PS) 32 46 768 discloses an arrangement wherein a cylindrical threaded insert is provided with circumferential grooves into which a plastic wall, which surrounds the threaded insert, projects with the corresponding sections. A ring made of an elastomeric material which radially encloses the threaded insert and is arranged in a groove of the threaded insert is used as a seal between the wall and the threaded insert. This construction has the disadvantage that the grooves at the threaded insert represent an additional manufacturing expenditure. In order to have the proper sealing effect, the receiving device of the ring must maintain narrow tolerances which, according to experiences, is connected with relatively high costs.

It is therefore an object of the invention to provide a threaded insert and an associated holding device and process for securing the same to an oil pan such that, while threaded insert is simplified with respect to its construction and with respect to tolerances, it is firmly and tightly connected with the oil pan, even when highly stressed over a relatively long period of time.

Principal advantages achieved by preferred embodiments of the present invention are that the metallic threaded insert, including a cylindrical section having a collar provided at one end, represents a simple component. The connecting of the threaded insert with an oil pan takes place at the collar, specifically by means of an adhesive device which carries out two functions: (1) holding and (2) sealing. The adhesive device is an adhesive film which may be a commercial product and, for example, by means of punching. Finally, the threaded insert may be connected with the oil pan by low-cost process steps.

Other objects, advantages and novel features of the present invention will become apparent from the following detailed description of the invention when considered in conjunction with the accompanying drawings.

BRIEF DESCRIPTION OF THE DRAWING

In the single drawing FIGURE, which is an enlarged sectional view of an oil pan in the area of an oil drain plug, an embodiment is shown which is described in detail in connection with a process of attachment in the following.

DETAILED DESCRIPTION OF THE DRAWING

The oil pan 1, which is made of a plastic material and, in a conventional manner, is fastened to the underside of an internal combustion engine crankcase, which is not shown, comprises a wall 2 which is equipped with a threaded insert 3 for an oil drain plug 4. The threaded insert 3 is made of a metal material, such as brass, and is formed by a cylindrical section 5 and a collar 6, the collar 6 having circular shape. With the interposition of an adhesive device 7, the collar 6 rests on an outer wall section 8 of the wall 2.

The adhesive device 7 is an adhesive film 9 made of a polyester resin or epoxy resin which was prepared from a commercially available initial product (roll, foil or the like) by means of punching. The adhesive film 9 is used as a holding device for the threaded insert 3 as well as for sealing. It is gastight and fluidtight, so that corresponding media do not penetrate from an interior of the oil pan 1 to an exterior side 11. From the direction of the exterior side 11, the threaded insert 3 extends to the wall 2 of the oil pan 1.

In the area of the collar 6 and of the adhesive film 9, the exterior wall section 8 is provided with a recess 12. This recess 12 ensures that the collar 6 is integrated into the oil pan 1 so that it is flush with the surface.

The process for connecting the threaded insert 3 with the oil pan 1 takes place by means of the following steps:
  the adhesive film 9 is formed by punching-out;
  the adhesive film 9 which, as a starting material, is slightly adhesive, is placed against the collar 6 of the threaded insert 3;
  by means of a heated tool 13, the threaded insert 3 is pressed into the plastic matrix.

When the adhesive film 9 is pressed into the hot plastic matrix of the oil pan 1, the adhesive film 9 will first soften and will then cure together with the plastic matrix. By means of the softening, the adhesive film 9 acquires high binding properties and adheres to the metallic threaded insert 3 as well as to the cured plastic material (wall 2).

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An arrangement for securing a metallic threaded insert to an oil pan made of plastic material for an internal combustion engine, the metallic threaded insert being constructed to be gastight and fluidtight with respect to the oil pan for receiving an oil drain plug, the threaded insert having a cylindrical section which rests in a wall of the oil pan, wherein the threaded insert, at an end area of the cylindrical section adjacent to an exterior side of the wall of the oil pan, has a collar which, by means of a sealing adhesive means, is held at an outer wall section of the oil pan,
   wherein the adhesive means is a punched out adhesive film which holds the threaded insert in an axial direction thereof at the oil pan in a force locking manner.

2. An arrangement for securing a metallic threaded insert to an oil pan made of plastic material for an internal combustion engine, the metallic threaded insert being constructed to be gastight and fluidtight with respect to the oil pan for receiving an oil drain plug, the threaded insert having a cylindrical section which rests in a wall of an oil pan, wherein the threaded insert, at an end area of the cylindrical section adjacent to an exterior side of the wall of the oil pan, has a collar which, by means of a sealing adhesive means, is held at an outer wall section of the oil pan,
   wherein the outer wall section, for receiving of the collar, has a recess so that the collar is integrated into the oil pan so that it is substantially flush with the exterior side of the wall.

3. An arrangement for securing a metallic threaded insert to an oil pan according to claim 1, wherein the adhesive film comprises a material selected from the group of polyester resins and epoxy resins and is changed to a final state thereof by means of a heat treatment.

4. A process for connecting a threaded insert by an adhesive film at an oil pan having an oil pan wall made of a plastic matrix material comprising the steps of:

forming the adhesive film by means of punching out;
connecting the adhesive film with a collar of the threaded insert;
pressing the threaded insert, together with the adhesive film, into the plastic matrix material of an oil pan wall by means of a heated tool.

* * * * *